United States Patent Office 2,842,121
Patented July 8, 1958

2,842,121
CAST FORMING MATERIAL AND METHOD OF MAKING

Orman B. Billings and Leo Brickman, Metuchen, N. J., assignors to Johnson & Johnson, a corporation of New Jersey No Drawing. Application June 15, 1955
Serial No. 515,793

Claims priority, application Canada September 4, 1954

6 Claims. (Cl. 128—91)

This invention relates to cast-forming materials useful for producing immobilizing casts, and more particularly to flexibly supported plaster of Paris or the like settable inorganic material containing potentially-reactive aminoplast resin and curing catalyst, which cast-forming materials may be wetted with water and formed in the usual manner into high-strength casts.

Cast-forming materials for producing immobilizing casts composed of plaster of Paris or other settable inorganic material supported on a suitable backing material such as cotton gauze are well known and have achieved substantial commercial success; especially the so-called "hard-coated" cast-forming material.

However, the art is confronted by the problem of providing immobilizing casts of this type having adequate strength and at the same time being relatively low in weight and thickness. In addition, the cast should have sufficient X-ray transparency to permit the taking of X-ray pictures of the cast-supported body member. Furthermore, the cast should be resistant to deterioration upon contact with water and also resistant to the growth or reproduction of micro-organisms.

The discoveries associated with the invention related to solution of the above discussed problems, and the objects achieved in accordance with the invention as described herein include: the provision of a cast-forming material useful for producing an immobilizing cast containing about 5 to 30% of potentially-reactive aminoplast resin and about 95 to 70% of plaster of Paris or the like inorganic settable material bonded to a flexible backing, containing about 2.5 to 30% of resin-curing catalyst based on the weight of said resin; the provision of such a cast-forming material having one surface thereof coated to an extent of about 10 to 40% of its area with discrete smooth globules comprising polyethylene glycol having a molecular weight in the range of about 5000 to 7000 and resin-curing catalyst finely dispersed therein; the provision of such a cast-forming material wherein the catalyst is solid and of a particle size in the range of 80 mesh or finer (U. S. series); the provision of such a cast-forming material wherein the amount of polyethylene glycol is at least equal to the weight of the catalyst dispersed therein; the provision of such a cast-forming material wherein the catalyst comprises ammonium chloride; and other objects which will be apparent in view of details or embodiments of the invention as set forth hereinafter.

In order to facilitate a clear understanding of the invention, the following preferred embodiments are described in detail:

EXAMPLE 1

A mixture of:
10 parts by weight melamine-formaldehyde resin (water soluble, made from 1 mol of melamine and 4 mols of formaldehyde)
90 parts of alpha gypsum
0.4 part boric acid
0.8 part aqueous ammonia (28% by weight)
1.2 parts polyvinyl acetate aqueous emulsion (containing 55% by weight polyvinyl acetate)
40 parts of water having the consistency of a thin paste and a pH of about 9.5, was coated on cotton gauze and dried for about 2 minutes at 275° F.

A strip of the resulting dried cast-forming material (4 inches by 5 yards) was dipped into water (about 2 to 3 times the gross or bulk volume of the cast-forming material) and then wrapped around a cylindrical form to prepare a cast in the usual manner, using about 25 laminations of the cast-forming material. After setting at the times indicated below, it was tested for cast strength according to Federal Specification GG–B–107, June 21, 1951, Section 4.3.6:

Table I

| Time | 4 hrs. | 24 hrs. | 7 days |
|---|---|---|---|
| Strength (pounds): | | | |
| Example 1 | 510 | 693 | 903 |
| Control [1] | 400 | 400 | 800 |

[1] Similar to Example 1, except without the resin.

It is evident from the foregoing data that the inclusion of the resin provides a surprising increase in strength, especially when one considers that the resin alone does not produce a supporting solid under these conditions.

EXAMPLE 2

A cast-forming material prepared according to Example 1, cooled to about 70° F., was sprayed with a suspension of finely divided solid ammonium chloride in molten polyethylene glycol (molecular weight 6000, available as Carbowax 6000), containing 1 part of the ammonium chloride per 2 parts of the polyethylene glycol (and 0.001 part of 2,5-di-tertiary-butyl p-cresol as an anti-oxidant). The molten mixture was sprayed at a temperature of about 190 to 210° F. and a pressure in the range of about 150 to 400 p. s. i. g. (pounds per square inch gauge), with air at 100 p. s. i. g. (preferably preheated to 500° F.) in conventional apparatus. The resulting product was subjected to the above described tests, and the following results were obtained:

Table II

| Time | 1 day | 7 days |
|---|---|---|
| Strength (pounds): | | |
| Example 2 | 882 | 1,250 |
| Control [1] | 450 | 894 |

[1] Similar to Example 2, except without the resin.

As shown by this data, the inclusion of a small proportion of the resin gives a marked increase in cast strength. These casts give adequate support, even though made unusually thin, especially to permit markedly clearer X-ray examination of a supported body member, are exceptionally resistant to deterioration on contact with water or the like liquids, and resist micro-organism growth.

Comparable results to the foregoing are achieved with various modifications thereof, such as the following. The flexible backing or support for the plaster of Paris or the like settable material may be cotton, nylon, rayon, glass, synthetic plastic, and the like woven as gauze, knitted, or formed into pervious sheets.

The settable material may be alpha gypsum or ordinary orthopedic plaster of Paris. The polyethylene glycol in which catalyst may be dispersed is one having a molecular weight in the range of about 5000 to 7000. Lower weights tend to give products having poor shelf life, and higher weights give undue grittiness or poor solubility. The potentially-reactive aminoplast resin may be one prepared from formaldehyde or the like lower aliphatic aldehyde and an amino material as known in the art; and, as the latter, amino-triazines are desirable and of these melamine is especially preferred. The potentially-reactive resins should be water soluble or water dispersible and yet give a cast forming material capable of being cured to a hard, water resistant state; and for this purpose the condensation product of about 1 mol of melamine with 3 or more mols of formaldehyde is desirable. A preferred resin may be prepared by mixing one mol of melamine with 4 mols of formaldehyde (in about 37% aqueous solution, so-called "formalin") brought to a pH of about 8.84 by the addition of about 3% aqueous sodium hydroxide solution, heated under reflux for about 15 minutes followed by removal of by-product water as vapor until the temperature of the reaction mixture reaches about 105° C., at which time the operation is discontinued and the batch cooled to about 60° C. as rapidly as possible (such as by indirect cooling). The resulting product is a clear, slightly viscous, oily-appearing syrup having a pH of about 8.1 and a resin content of about 50%.

The composition may contain about 5 to 30% of the potentially reactive resin (based on the weight of resin plus plaster of Paris or the like material, dry basis), desirably up to 20% and preferably 10 to 15% of the resin. The higher proportions of resin give higher ultimate cast strengths, but lower early cast strengths.

From the manufacturing viewpoint, the use of water as a liquid dispersing medium for the paste or slurry is desirable and this is reflected in a particularly desirable product, especially from the viewpoint of minimizing undesirable irritation of the skin of the body member in contact therewith. However, other liquids may be used, such as isopropyl alcohol methylene chloride, aqueous ethyl alcohol (75%) or the like organic materials; and in a non-aqueous system the retarder, such as ammonium borate, need not be used.

The time period between paste formation and the final drying of the cast forming material is critical since the plaster of Paris and resin are subjected to conditions which tend to destroy or derogate from the sought-for properties of the cast forming material. Hence, control of operating variables in this period is important. One variable to be controlled is the pH of the paste, and it is maintained above about 7.0, and preferably in the approximate range 7.0 to 10.0, in order to minimize curing of the resin, e. g., by incorporating a suitable amount of alkaline material and by eliminating any ingredients which would tend to lower the pH. Retarders other than the ammonium borate mentioned specifically may be employed in usual manner providing they do not produce undesirably low pH so as to effect advancement or curing of the resin.

Drying, i. e. removal of liquid from the impregnated cast forming material, whether it be aqueous or non-aqueous liquid as described above, is carried out at temperature and other conditions which minimize tendency of the resin to advance or cure. Removal of liquid should be brought about in the minimum time and at the minimum temperature feasible. That is, the drying conditions should be maintained so that the time required to effect desired degree of removal of liquid is short enough so that curing of the resin is not excessive; e. g. 1 to 20 minutes. Furthermore, during this drying period, temperature is maintained below a level at which appreciable curing will take place, but sufficiently high to effect removal of liquid within the time limits specified above. Most preferably, temperatures are maintained at not greater than about 300° F. A suitable operating range of temperature for drying aqueous pastes is 200 to 300° F.

The reason for the critical nature of the drying period is that liquid, particularly water, tends to promote or catalyze not only setting of the plaster of Paris, i. e., conversion to the dihydrate or gypsum, but also tends to catalyze advancement or curing of the resin. The resin once cured, of course, can impart no strengthening characteristics to the cast-forming material and, in fact, materially detracts from the strength properties that the plaster of Paris would have in the absence of any resin. Accordingly, drying conditions described above are maintained until free (volatile) water content of the cast forming material has been reduced to below 0.3% based on the weight of the cast forming material.

Pursuant to maintaining desired low water content of the bandage and preventing the cast forming material, once dried, from absorbing water from the atmosphere, the cast forming material is most preferably wrapped in a sealed substantially water vapor impermeable wrapper or container promptly after leaving the drying operation. If the cast forming material is to be slit into widths narrower than the web, coated and dried in the operation of making the cast forming material, such slitting will preferably be carried out after drying and before packaging so that the packaged cast forming material, once sealed, may be maintained intact until finally used by the consumer.

The cast forming materials of the invention may contain conventional amounts of plasticizer such as glycerols, glycols, polyglycols, and the like. Setting time of the cast forming material may be controlled by addition of accelerators or retarders known in the art to be effective for controlling the setting time of the plaster of Paris. Retarders include soluble citrates, phosphates, acetates, or other organic retarders. These ingredients, when used, are generally incorporated into the plaster of Paris—resin paste described above.

Another ingredient employed in preferred embodiments of the invention is a binder which serves the purpose of effecting maximum adhesion of the plaster of Paris and resin to the backing material. Suitable binders are polyvinyl acetate emulsions. Other usable binders include emulsions or solutions of polymers of vinyl chloride, vinyl acetate, acrylates, methacrylates, or butadiene; or co-polymers, interpolymers or polymeric mixtures thereof. The binder is preferably mixed into the paste just as are the other components of the bandage.

It is indeed surprising that elements useful for producing an immobilizing cast may be prepared in such a convenient manner in accordance with the invention as described above, and especially that the resulting elements overcome the disadvantages of the heretofore proposed materials, as discussed above.

In view of the foregoing disclosures, variations or modification thereof will be apparent, and it is intended to include within the invention all such variations and modifications except as do not come within the scope of the appended claims.

We claim:

1. A cast forming material, useful for producing an immobilizing cast, comprising a flexible, pervious backing bonded to a substantially dry composition comprising about 5 to 30% of potentially-reactive melamine-formaldehyde resin and about 95 to 70% of plaster of Paris based on the weight of said composition, said cast forming material containing resin-curing catalyst in an amount in the range of about 2.5 to 30% based on the weight of the resin therein, said material having one surface thereof coated to the extent of about 10 to 40% of its area with discrete smooth globules comprising a dispersion of resin-curing catalyst in polyethylene glycol having a molecular weight in the range of about 5000 to 7000.

2. A cast forming material of claim 1 wherein the catalyst is solid and of a particle size not greater than 80 mesh, the proportion of the polyethylene glycol in said cast forming material being in the range of an amount equal to the weight of the solid catalyst dispersed therein up to 6% of the weight of the resin plus plaster composition.

3. A cast forming material of claim 2 wherein the dry composition contains 90% of alpha gypsum, 10% of melamine-formaldehyde resin, and the coating comprises 1% of solid ammonium chloride of 80 to 100 mesh and 2% of polyethylene glycol of a molecular weight of about 6000.

4. A method for producing a cast forming material comprising a flexible, pervious backing bonded to a substantially dry composition comprising about 5 to 30% of potentially-reactive melamine-formaldehyde resin and about 95 to 70% of plaster of Paris based on the weight of said composition, which cast forming material contains resin-curing catalyst in an amount in the range of about 2.5 to 30% based on the weight of the resin therein, which method comprises applying to the backing a slurry of the coating composition in a liquid medium and drying at a combination of conditions within the range of a temperature of up to about 300° F., a time in the range of about 1 to 20 minutes, and a pH in the range of about 7 to 10, such that the resin retains substantially all of its potential reactivity and the plaster of Paris retains substantially all of its potential setting power, followed by applying to one surface thereof to the extent of about 10 to 40% of its area discrete small globules comprising a dispersion of resin-curing catalyst in polyethylene glycol having a molecular weight in the range of about 5000 to 7000.

5. A method of claim 4 wherein the catalyst is solid and of a particle size not greater than 80 mesh, the proportion of the polyethylene glycol in said cast forming material being in the range of an amount equal to the weight of the solid catalyst dispersed therein up to 6% of the weight of the resin plus plaster composition.

6. A method of claim 5 wherein the dry composition contains 90% of alpha gypsum, 10% melamine-formaldehyde resin, and the coating comprises 1% of solid ammonium chloride of 80 to 100 mesh and 2% of polyethylene glycol of a molecular weight of about 6000.

References Cited in the file of this patent

UNITED STATES PATENTS

| | | |
|---|---|---|
| 2,315,484 | Hardy | Apr. 6, 1943 |
| 2,419,440 | Delmonte | Apr. 22, 1947 |
| 2,571,343 | Dailey | Oct. 16, 1951 |

FOREIGN PATENTS

| | | |
|---|---|---|
| 583,471 | Great Britain | Dec. 19, 1946 |